Figure 1:
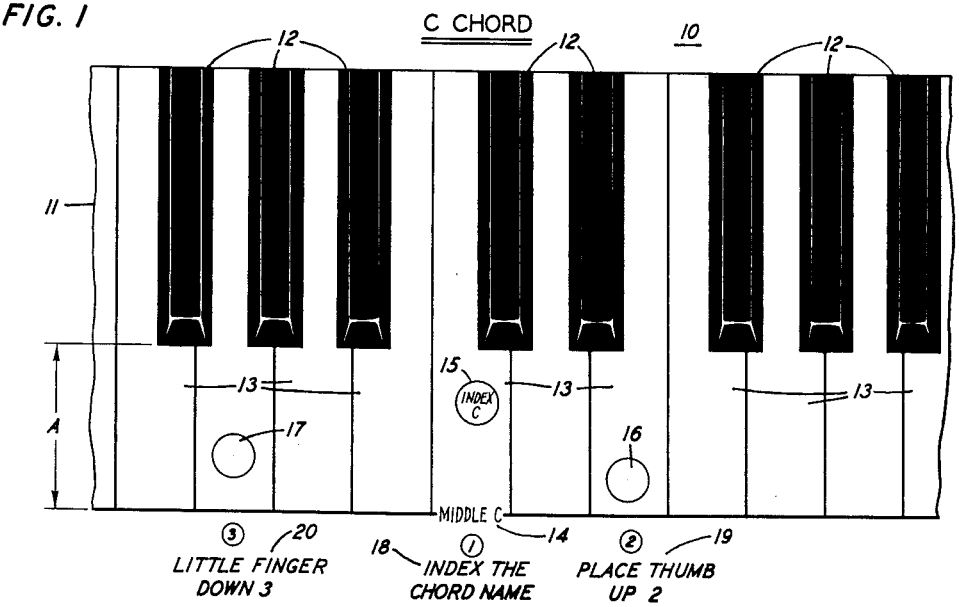

May 16, 1961  E. J. McGINLEY  2,984,143
MUSICAL CHORD CHART
Filed Oct. 10, 1960

INVENTOR
EDWARD J. MC GINLEY
BY Hugh S. Wertz
ATTORNEY

United States Patent Office 2,984,143
Patented May 16, 1961

2,984,143
MUSICAL CHORD CHART
Edward J. McGinley, 76 Old Hollow Road,
Short Hills, N.J.
Filed Oct. 10, 1960, Ser. No. 61,714
5 Claims. (Cl. 84—471)

This invention relates to music charts and more specifically to such charts which aid in the formation and playing of chords on keyboard instruments, e.g., pianos and/or organs, by music students with and without teachers.

A general object of this invention is to facilitate the formation and playing of chords on a musical instrument of the keyboard type by a beginner or by a person of limited musical knowledge or experience.

In a copending application of the present inventor, Ser. No. 39,874, filed June 30, 1960, there is disclosed a type of chart to aid in the playing of keyboard instruments which has printed, or otherwise represented thereon, a portion of a piano or organ keyboard and also the words of the song to be played. The words are arranged so that each word, or syllable of a multi-syllable word, that is to be played on a white key is placed on the representation of the key on which it is to be played while each word or syllable corresponding to a black key is placed in a black background or in a suitable box or other designation below the appropriate black key representation. The words and syllables are generally arranged in a series of vertically spaced horizontal lines. This chart also contains information in the form of cue numbers or indicia which designate appropriate chords to be played by the left hand, if a single player is using the instrument, or by another player. This information usually gives only the name of the chord but does not show the notes or keys making up the chord.

Moreover, many forms of sheet music now being published give, in addition to the melody and other notes to be played on the piano or organ, the names of the chords which make up the harmonic element of the composition to accompany the melody. Generally, when such chord names are given, the notes forming the chord are not shown. Furthermore, in neither the above-identified chart nor in the sheet music is there any indication how the fingers are to be positioned to produce the chords.

It is accordingly another object of this invention to give aid to the student learning music, with or without a teacher being present, by not only identifying the keys to be played for each chord but also advising which fingers to use and showing how the fingers of the left hand are to be placed in the formation of the chord.

The above and related objects are attained in accordance with the invention by providing, by way of example, a series of charts having printed or otherwise represented thereon a portion of the keyboard of an instrument such as a piano or organ, the chart indicating both white and black keys of standard width but of any convenient length. Each chart is intended for a particular chord, or related chords, named thereon. A circle or other marker is placed on the representation of each key that is to be played and the position of the circle shows exactly where the appropriate finger tip should be placed on the key for a normal comfortable hand position. When the indicated finger tips are placed in the circles on the chart, the fingers are automatically curved and the hand is shaped in the proper position to play the chord comfortably. This is an important feature of the present invention. There may also be given in the proper circle or adjacent thereto, or below the key, information as to the correct finger (or thumb) to be used and/or how it is to be positioned.

Figure 2:
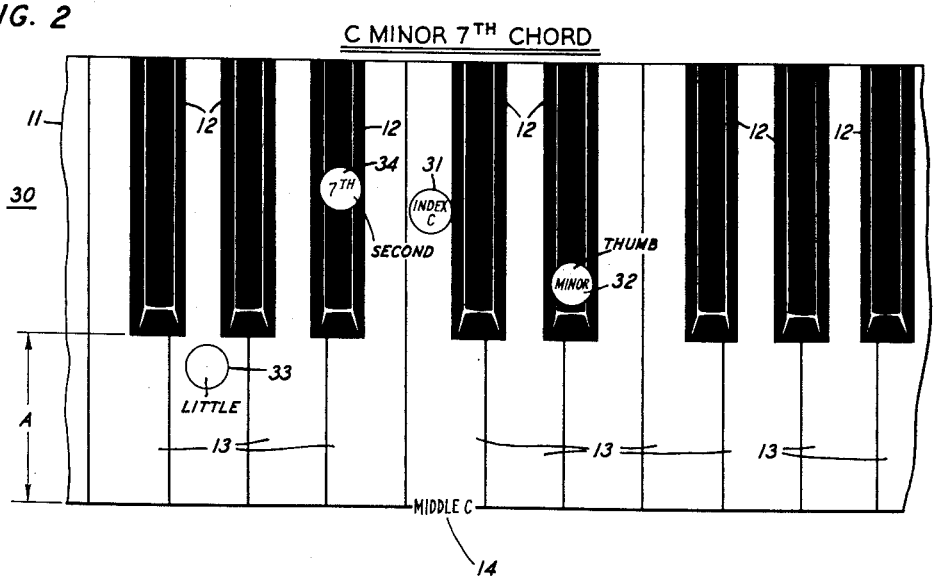

The invention will be more readily understood by referring to the following description taken in connection with the accompanying drawing forming a part thereof, in which:

Fig. 1 shows the front face of a portion of a chart in accordance with the invention, showing the keys to be played and the positions of the finger tips in the formation of a "C" chord; and Fig. 2 shows a chart similar to that of Fig. 1 except that the fingering and finger placements for the "C" minor 7th chord are indicated thereon.

Referring more specifically to the drawing, Fig. 1 shows, by way of example, for purposes of illustration, a chord indicating chart 10 in accordance with the invention. The chart 10 is a device by means of which a music student with or without a teacher in attendance, or even without any teacher, can learn the proper formation of chords that may be identified by name only on other charts or sheet music. It can be used in conjunction with such other charts or sheet music or it can be used independently of either.

The chart 10 comprises a card or sheet 11 on which are printed or otherwise represented a number of black and white keys of a keyboard of a piano, organ or the like. If desired, the card or sheet 11 can be a page of a book which may also include text or other related material. By way of example, two or three octaves of keys can be represented but fewer than this number have been shown for simplicity in the drawing. The black keys 12 are arranged in groups of two and three, as on the keyboard of a piano or organ, and each is preferably of approximately the same width as a black key of a standard instrument. The white keys are also of substantially the same width as white keys of a standard piano or organ. Both types of keys may be of any convenient length but preferably the distance A from the front of the black keys to the front of the white keys is made equal to the corresponding distance on the keys of a standard piano. The identification of "Middle C" is printed or otherwise formed at 14 on the appropriate white key 13 so that the player knows the exact location of the keys to be played as they relate to his own instrument.

In the chart 10 of Fig. 1 representing the formation of the "C" chord, the position of the index finger is shown by the circle or other marker 15 (on the key representing the note C) and, if desired, the word "Index" can be placed therein. The position of the thumb is shown by the circle or other marker 16 (placed on the key representing the key E), and the position of the little finger is shown by the circle or other marker 17 which is placed on the key representing the key G. Under the representation of the keyboard there may be placed fingering instructions such as "(1) Index the Chord Name" shown at 18, "(2) Place Thumb Up 2" shown at 19, and "(3) Little Finger Down 3" shown at 20.

In using the chart, the directions are followed and the finger (this term is used generically herein and in the claims to include also the thumb) tips are placed as indicated by the markers 15, 16 and 17. When so placed, the fingers and hand naturally assume the correct curvature and position to play the chord correctly. As a matter of fact, it is quite impossible to place the finger tips precisely in the indicated circles without curving the fingers. Since the markers 15, 16 and 17 are placed on the correct keys and in the precise positions on the keys for playing the chord correctly, and since the keys are of the correct width, after several trial positionings of the finger tips to the markers 15, 16 and 17 it is very easy and natural to transfer the finger tips to the actual piano or organ keyboard and play the chord on the instrument. It is very simple to follow the indications 15, 16 and 17 and, if they are given, the indications 18, 19 and 20 on the chart 10 and soon the student becomes quite proficient in the formation of the "C" chord. Then he can progress to another chord, of which there are many.

The chart 30 of Fig. 2 illustrates just one of the many other chords which can be illustrated in the manner just described. In the "C minor 7th" chord shown, the index finger is placed on the marker 31, the thumb on the marker 32, the little finger on the marker 33 and the middle finger on the marker 34. Note that in order to play this chord comfortably the positions of the fingers are, in some cases, much higher up on identical keys than in the chart 10 of Fig. 1. As in Fig. 1, however, the exact positions of the fingers tips to play the chord correctly (naturally and comfortably) have been shown by the positions of the markers 31, 32, 33 and 34. Except for the different positions of the markers (caused by the difference in the chord make-ups), everything said above with respect to Fig. 1 applies equally to Fig. 2. Fingering instructions, like those shown by the reference characters 18, 19 and 20 in Fig. 1, can be used in Fig. 2 also but they have been left off the drawing of Fig. 2 for simplicity therein. If desired, the words "Thumbs," "Little," and "Second" can be positioned in or adjacent the markers 32, 33 and 34 to indicate the proper fingers to be used.

The full advantages of the invention are obtained only when the widths of the keys 12 and 13 are of standard size and when the distance A corresponds to the corresponding distance on a standard piano, as by this means the hand as well as the mind and eye are trained to play the chords correctly.

Various changes can be made in the embodiments described above without departing from the spirit of the invention, as indicated in the claims.

What is claimed is:

1. A music chart for use on a keyboard instrument such as a piano, organ or the like to designate the keys to be struck in playing a specified chord, comprising a chart having representations thereon which correspond to a row of black and white keys on said instrument, the width of each black or white key representation of the chart being substanitally the same as the width of a corresponding key on the instrument and the distance from the front of the black key representations to the front of said white key representations being substantially the same as the corresponding distance on the instrument keyboard, and markers on selected ones of said key representations corresponding to the keys forming said chord, said markers being in the correct locations on said key representations to indicate where the finger tips are placed to play the chord with a natural hand position on the keyboard instrument.

2. The combination of elements as in claim 1 in further combination with means for identifying middle C on the chart.

3. The combination of elements as in claim 1 in further combination with a finger designation for at least one of said markers.

4. The combination of elements as in claim 1 in further combination with finger designations for all of said markers.

5. The combination of elements as in claim 1 in further combination with fingering instructions for each finger associated with the key representations corresponding to the keys forming said chord.

References Cited in the file of this patent

UNITED STATES PATENTS

| | | |
|---|---|---|
| 1,576,004 | Rosenberg | Mar. 9, 1926 |
| 2,188,098 | Bostelmann | Jan. 23, 1940 |